April 19, 1949.  W. J. FREUND  2,467,885
SOLAR HEATER FOR HEATING LIQUIDS
Filed Nov. 17, 1944
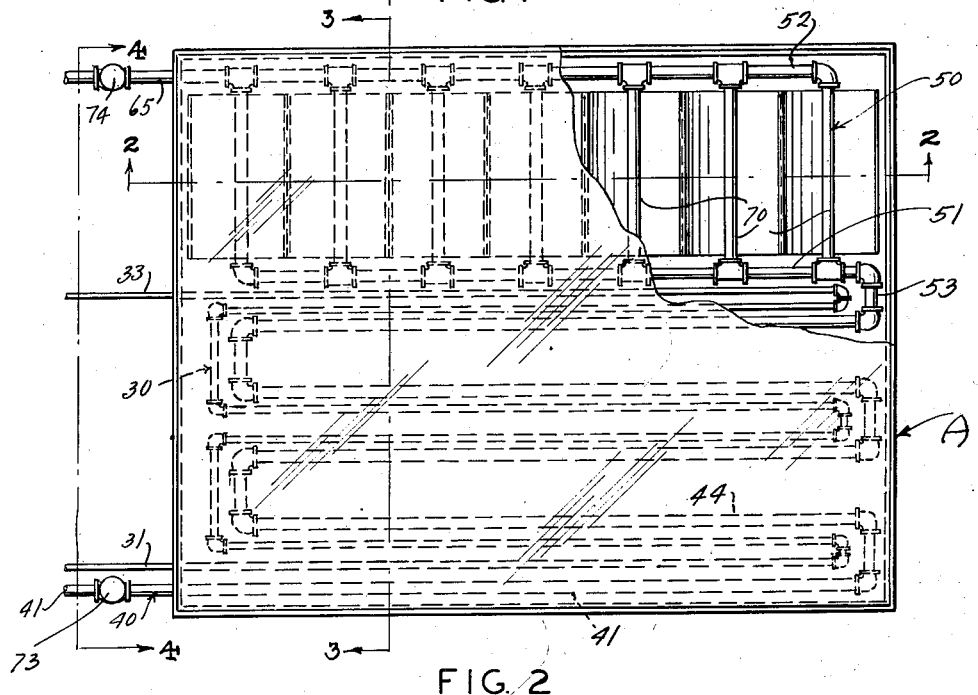
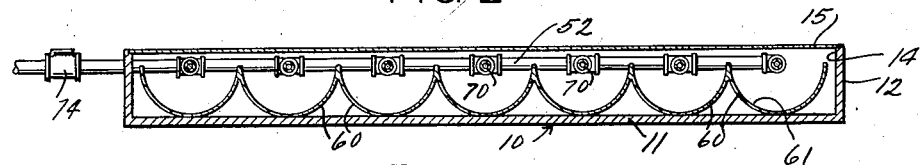
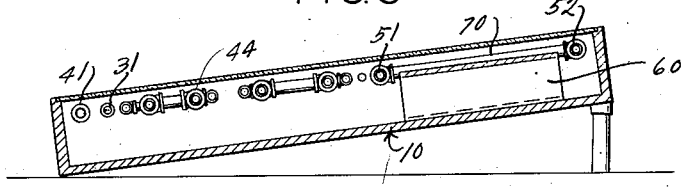
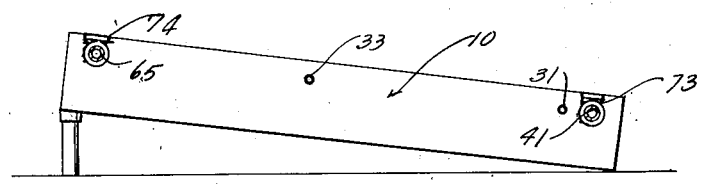
INVENTOR.
WILLIAM J. FREUND
BY
ATTORNEYS Patented Apr. 19, 1949

2,467,885

UNITED STATES PATENT OFFICE 2,467,885

SOLAR HEATER FOR HEATING LIQUIDS

William J. Freund, Miami, Fla., assignor of forty-four one-hundredths to Walter J. Kelly, Miami, Fla.

Application November 17, 1944, Serial No. 563,902

2 Claims. (Cl. 126—271)

This invention relates to improvements in solar heaters.

The primary object of this invention is the provision of an improved solar heater which is relatively simple in construction and which will efficiently produce hot water for domestic use, as well as for other purposes.

A further object of this invention is the provision of a solar heater having means for heating water for domestic supply purposes and which includes means for additionally heating a fluid of less volatile nature than water for the operation of other units such as coolers, refrigerators, air conditioning systems, etc.

Other objects and advantages of this invention will be apparent during the course of the following detailed description.

In the accompanying drawing, forming a part of this specification, and wherein similar reference characters designate corresponding parts thruout the several views, Figure 1 is a plan view of one form of improved solar heater.

Figures 2, 3 and 4 are cross sectional views taken substantially on their respective lines in Figure 1 of the drawing.

In the drawing, wherein for the purpose of illustration is shown a preferred form of the invention, the letter A may generally designate the solar heater.

In the solar heater A, I prefer to provide a casing 10 including a bottom 11 and upstanding border walls 12. If desired, I may enclose a compartment 14 of this casing by means of a transparent wall 15, of glass or other materials which will not appreciably affect the efficiency of the sun's rays playing upon the tubes in the heater.

As set forth in my co-pending applications, Serial Number 563,903, filed November 17, 1944; and Serial Number 563,905, filed November 17, 1944; I contemplate the operation of cooling units, refrigeration apparatus and air conditioning systems thru the utilization of hot water heated in the solar heater. To that end I provide means for the accommodation of a suitable volatile fluid utilized in connection with the operation of such apparatus and I also provide means for heating a domestic water supply in a simple and accessible assembly of parts.

The improved solar heater A includes a hot water heating coil 30 for domestic supply of water. This includes a cold water intake conduit or tube 31 which extends into the side wall of the casing and in the compartment 14 and therein is coiled back and forth for about one-half of the area of the compartment, and it has a hot water outlet conduit 33 leading from the casing to the hot water supply tank.

The means 40 for heating a suitable liquid adapted to be used in connection with operating cooling and refrigeration units, etc., includes an intake conduit 41 extending into the compartment 14 where it is coiled, providing the coil 44, in nesting relation with the coil of the domestic hot water tube and preferably located in the same plane therewith. The inner end of the coil 44, does not extend exteriorly of the casing, but continues to provide a booster unit 50. This booster unit preferably consists of intake and outlet headers 51 and 52; the former connecting at 53 with the end of the coil 44 to receive fluid therethru. The booster unit 50 preferably includes a plurality of concavo-convex reflectors 60 having mirrored surfaces 61. These concavo-convex reflectors are arranged with their axes transverse to the length of the coils of the domestic hot water tube and the heating coils. The concavo-convex reflectors 60 are arranged in parallelism and on the respective axes or focal points thereof the headers 51 and 52 are joined by heater tubes 70. The header 52 has an outlet end 65.

Inasmuch as the heating means 40 for receiving the fluid which will operate refrigeration and other units is adapted to elevate the pressure in the tubes of this system, I prefer to provide pressure regulating check valves 73 and 74 on the inlet and outlet tubes 41 and 65, preferably exteriorly of the casing 10.

This solar unit may be placed upon an incline, so as to better take advantage of the rays of the sun.

It is quite apparent that the coiled portion 44 forms a heater for preliminary heating of the volatile fluid and the booster unit 50 increases the temperature and pressure of the fluid as it passes into the outlet header 52. Of course the rays of light will be concentrated upon the connecting tubes 70.

The solar heater fluid should be non-inflammable and as freely flowing as water. Approximately this fluid has a boiling point of 340° F. and a freezing point of —60° F. The two fluids I may use are the following:

(a) ethylene glycol HOCH₂CH₂OH
(b) diethylene glycol 2,2'-oxydiethanol; Di-2 hydroxyethyl ether; HOCH₂CH₂OCH₂CH₂OH Various changes in the shape, size and arrangement of parts may be made in the form of invention herein shown and described, without depart-

I claim:

1. In a solar heater, a casing having an open top and a sheet of transparent material covering said open top, providing a chamber; tubular means in one portion of said chamber for the flow of a fluid through said means for heating said fluid, including a plurality of substantially parallel, elongated tube sections; means in another portion of said chamber for receiving the heated fluid from said first tubular means, including an intake header, an outlet header and a plurality of substantially parallel, elongated cross tube sections, each opening into said headers, with the longitudinal axes of said cross tube sections substantially normal to the longitudinal axes of said first tube sections; and reflector means wholly within said other portion of said chamber, disposed to concentrate the solar rays onto said cross tube sections.

2. In a solar heater, a casing having an open top and a sheet of transparent material covering said open top, providing a chamber; tubular means in one portion of said chamber for the flow of a fluid through said means for heating said fluid, including a plurality of substantially parallel, elongated tube sections; means in another portion of said chamber for receiving the heated fluid from said first tubular means, including an intake header, an outlet header and a plurality of substantially parallel, elongated cross tube sections, each opening into said headers, with the longitudinal axes of said cross tube sections substantially normal to the longitudinal axes of said first tube sections and said headers; and reflector means wholly within said other portion of said chamber, disposed to concentrate the solar rays onto said cross tube sections.

WILLIAM J. FREUND.

REFERENCES CITED

The following references are of record in the file of this patent:

UNITED STATES PATENTS

| Number | Name | Date |
| --- | --- | --- |
| 117,476 | Sperry | July 25, 1871 |
| 735,321 | Walker | Aug. 4, 1903 |
| 761,596 | Moss | May 31, 1904 |
| 921,976 | Glass | May 18, 1909 |
| 1,014,972 | Nichols | Jan. 16, 1912 |
| 1,047,554 | Nichols | Dec. 17, 1912 |
| 1,258,405 | Harrison | Mar. 5, 1918 |
| 1,765,136 | Drane, Jr. | June 17, 1930 |
| 1,971,242 | Wheeler | Aug. 21, 1934 |
| 2,274,492 | Modine | Feb. 24, 1942 |
| 2,221,971 | Haywood | Nov. 19, 1940 |
| 2,311,579 | Scott | Feb. 16, 1943 |

FOREIGN PATENTS

| Number | Country | Date |
| --- | --- | --- |
| 738,406 | France | Oct. 17, 1932 |